United States Patent
Shinozaki

(10) Patent No.: US 10,077,384 B2
(45) Date of Patent: Sep. 18, 2018

(54) THERMOSET PRESSURE-SENSITIVE ADHESIVE

(71) Applicant: 3M INNOVATIVE PROPERTIES COMPANY, St. Paul, MN (US)

(72) Inventor: Kotaro Shinozaki, Kanagawa-pref. (JP)

(73) Assignee: 3M Innovative Properties Company, St. Paul, MN (US)

(*) Notice: Subject to any disclaimer, the term of this patent is extended or adjusted under 35 U.S.C. 154(b) by 144 days.

(21) Appl. No.: 15/122,189

(22) PCT Filed: Mar. 4, 2015

(86) PCT No.: PCT/US2015/018712
§ 371 (c)(1),
(2) Date: Aug. 29, 2016

(87) PCT Pub. No.: WO2015/134593
PCT Pub. Date: Sep. 11, 2015

(65) Prior Publication Data
US 2016/0369139 A1    Dec. 22, 2016

(30) Foreign Application Priority Data
Mar. 7, 2014 (JP) .................... 2014-044967

(51) Int. Cl.

| | | |
|---|---|---|
| *B32B 7/12* | (2006.01) | |
| *C09J 133/26* | (2006.01) | |
| *C09J 159/00* | (2006.01) | |
| *C09J 163/00* | (2006.01) | |
| *C08L 33/26* | (2006.01) | |
| *C08L 59/00* | (2006.01) | |
| *C08L 63/00* | (2006.01) | |
| *C08F 220/18* | (2006.01) | |
| *C08F 220/56* | (2006.01) | |
| *C08F 222/10* | (2006.01) | |
| *C09J 4/06* | (2006.01) | |
| *C09J 5/00* | (2006.01) | |

(52) U.S. Cl.
CPC ............ *C09J 163/00* (2013.01); *B32B 7/12* (2013.01); *C08F 220/18* (2013.01); *C08F 220/56* (2013.01); *C08F 222/10* (2013.01); *C09J 4/06* (2013.01); *C09J 5/00* (2013.01); *B32B 2250/02* (2013.01); *C09J 2463/00* (2013.01)

(58) Field of Classification Search
USPC ................. 428/414; 523/408; 427/208.4
See application file for complete search history.

(56) References Cited

U.S. PATENT DOCUMENTS

| | | | |
|---|---|---|---|
| 5,086,088 | A | 2/1992 | Kitano et al. |
| 6,194,492 | B1 | 2/2001 | Sakurai et al. |
| 2009/0120576 | A1 | 5/2009 | Ring et al. |
| 2010/0091223 | A1 | 4/2010 | Kim |
| 2012/0121900 | A1 | 5/2012 | Niwa |

FOREIGN PATENT DOCUMENTS

| | | | |
|---|---|---|---|
| CN | 103031089 | | 4/2013 |
| EP | 0386909 | | 9/1990 |
| GB | 870679 | | 6/1961 |
| JP | 409137141 | A * | 5/1997 |
| JP | 2001-115115 | | 4/2001 |
| JP | 2011-202158 | | 10/2011 |
| WO | WO 95/13327 | | 5/1995 |
| WO | WO 98/21287 | | 5/1998 |

OTHER PUBLICATIONS

International Search Report for PCT International Application No. PCT/US2015/018712 dated Apr. 7, 2015, 4 pages.
New Course for Civil Engineering Materials, Edited by Fang Wu, China Building Industry Press, May 2007, Edition 1, the third paragraph on p. 219; Basic Composition of Adhesive.
Practical Building Materials, Souhua Wang, et al., China Building Industry Press, Sep. 1988, Edition 1, the second paragraph on p. 719; Common Adhesives used in Buildings.

* cited by examiner

Primary Examiner — Tae H Yoon

(57) ABSTRACT

A thermoset pressure-sensitive adhesive containing a tacky polymer, polyvinyl acetal, an epoxy resin, and an epoxy resin curing agent. The tacky polymer is obtained by copolymerizing a first monomer constituted by at least one type of (meth)acrylate ester of a non-tertiary non-cyclic alcohol having 8 to 12 carbon atoms and including one (meth)acryloyl group, a second monomer comprising a nitrogen atom and an ethylenically unsaturated group, and more than 0 parts by mass to no more than about 0.5 parts by mass of a crosslinking agent per a total of 100 parts by mass of the first monomer and the second monomer.

20 Claims, 2 Drawing Sheets

THERMOSET PRESSURE-SENSITIVE ADHESIVE

CROSS REFERENCE TO RELATED APPLICATIONS

This application is a national stage filing under 35 U.S.C. 371 of PCT/US2015/018712, filed Mar. 4, 2015, which claims the benefit of Japanese Application No. 2014-044967, filed Mar. 7, 2014, the disclosures of which are incorporated by reference in their entireties herein.

FIELD OF THE INVENTION

The present invention relates to thermoset pressure-sensitive adhesives.

BACKGROUND ART

Thermoset pressure-sensitive adhesives are used to bond, for example, automotive glass substrates to automobile parts. Examples of documents of reference for the field in question include PCT Publication WO/1995/013327 and PCT Publication WO/1998/021287.

PCT Publication WO/1995/013327 discloses a method of imparting a permanent substrate with topographical characteristics or protective characteristics, wherein the thermoset heat-sensitive adhesive that is used contains a photochemical reaction product of starting materials constituted by i) a prepolymer or monomer syrup containing an acrylate ester or a methacrylate ester, ii) an epoxy resin, iii) a photopolymerization initiator, and iv) a thermally activated curing agent for epoxy resins. Publication WO/1998/021287 discloses a photopolymerizable precursor of a thermally curable pressure-sensitive adhesive, the precursor containing (i) a specific photopolymerizable component, (ii) a specific epoxy resin and/or monomer, (iii) a specific photoinitiator, and (iv) a specific nucleophilic latent curing agent.

SUMMARY OF THE INVENTION

Because various external forces act upon bonded parts in a wide range of environments from low temperatures to high temperatures, a high level of adhesiveness is demanded of thermoset pressure-sensitive adhesives in a wide range of environments. In addition, it is preferable for thermoset pressure-sensitive adhesives to have low fluidity as subsequent manufacturing steps may be impeded if thermoset pressure-sensitive adhesive is forced outside of the part when the part is being bonded.

In one aspect of the present invention, a thermoset pressure-sensitive adhesive is provided that contains a tacky polymer, polyvinyl acetal, an epoxy resin, and an epoxy resin curing agent. The tacky polymer is obtained by copolymerizing a first monomer constituted by at least one type of (meth)acrylate ester of a non-tertiary non-cyclic alcohol having 8 to 12 carbon atoms and having one (meth)acryloyl group, a second monomer having a nitrogen atom and an ethylenically unsaturated group, and more than 0 parts by mass to no more than about 0.5 parts by mass of a crosslinking agent per a total of 100 parts by mass of the first monomer and the second monomer.

In accordance with the present invention, a thermoset pressure-sensitive adhesive is provided that can exhibit a high level of adhesive strength (such as cleavage strength) against a variety of external forces in a wide range of environments from low temperatures to high temperatures (for example, from about 0° C. to about 80° C.). The thermoset pressure-sensitive adhesive can also exhibit low fluidity.

MODES FOR CARRYING OUT THE INVENTION

Figure 1A:
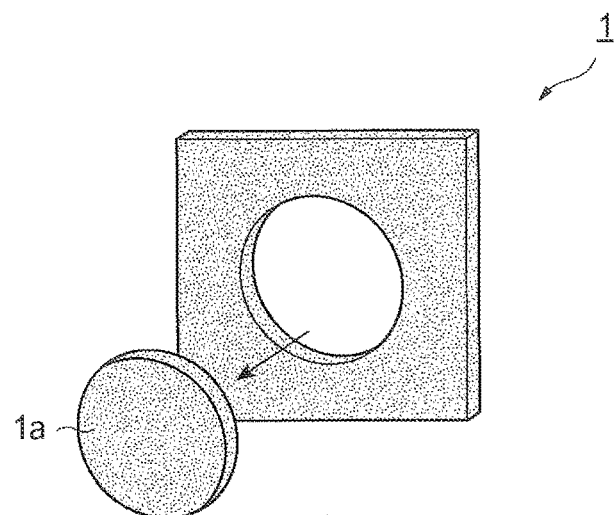
FIGS. 1A to 1C are schematic illustrations for describing a fluidity evaluation method.

The thermoset pressure-sensitive adhesive according to the present embodiment contains a tacky polymer, a polyvinyl acetal, an epoxy resin, and an epoxy resin curing agent.

In this context, "pressure-sensitive adhesive" refers to an adhesive that exhibits tackiness at the application temperature (typically from −20° C. to 60° C.), and "tacky" or "tackiness" signifies that the storage elastic modulus (G') as measured at 10 radians/second at the application temperature (preferably measured at 20° C. to 22° C.) is less than $3 \times 10^5$ pascals (Dahlquist criterion). The "tacky polymer" is a polymer having the aforementioned "tackiness", and the term "polymer" is used according to the definition of "polymer" set forth by the International Union of Pure and Applied Chemistry (IUPAC) (http://main.spsj.or.jp/cl9/iu-pac/Recommendations/glossary36.html).

The tacky polymer is obtained by copolymerizing a first monomer constituted by at least one type of (meth)acrylate ester of a non-tertiary non-cyclic alcohol having 8 to 12 carbon atoms and having one (meth)acryloyl group, a second monomer comprising a nitrogen atom and an ethylenically unsaturated group, and more than 0 parts by mass to no more than 0.5 parts by mass of a crosslinking agent per a total of 100 parts by mass of the first monomer and the second monomer. Herein, "parts by mass" may be expressed in terms of "parts by weight", and "parts by mass" and "parts by weight" are identically defined. "(Meth)acrylic" means acrylic or methacrylic, and similar compounds are identically defined.

The first monomer is constituted by at least one type of (meth)acrylate ester of a non-tertiary non-cyclic alcohol having 8 to 12 carbon atoms and having one (meth)acryloyl group. The number of carbon atoms in the non-tertiary non-cyclic alcohol may be from 8 to 10, with 8 being preferable. Specific examples of first monomers include 2-ethylhexyl (meth)acrylate, octyl (meth)acrylate, isooctyl (meth)acrylate, decyl (meth)acrylate, dodedeycl (meth)acrylate, lauryl (meth)acrylate, and mixtures thereof.

The second monomer includes a nitrogen atom and an ethylenically unsaturated group. The second monomer is a monomer that is copolymerized with the first monomer, and is different from the first monomer. Specific examples of the second monomer include N-vinyl pyrrolidone, N-vinyl caprolactone, (meth)acryloyl morpholine, (meth)acrylamide, N,N-dimethyl (meth)acrylamide, N,N-diethyl (meth)acrylamide, N,N-dimethylaminoethyl (meth)acrylate, N,N-diethylaminoethyl (meth)acrylate, N,N-dimethylaminopropyl (meth)acrylamide, (meth)acrylonitrile, and mixtures thereof.

The proportions of the first monomer and the second monomer (first monomer/second monomer) when copolymerizing the two may be from 60/40 to 95/5, from 65/35 to 90/10, or preferably from 70/30 to 85/15 for the sake of obtaining a tacky polymer having the desired tack and adhesive strength.

The crosslinking agent is a monomer capable of being copolymerized, for example, via a free radical reaction with the first monomer, and specifically is a polyfunctional monomer comprising multiple crosslinkable functional groups, such as a divinyl ether or a polyfunctional (meth)acrylate. There is no particular limitation upon the number of crosslinkable functional groups in the crosslinking agent; for example, there may be 2 or 3 groups. Specific examples of crosslinking agents include 1,6-hexanediol di(meth)acrylate, trimethylol propane tri(meth)acrylate, pentaerythritol tetra(meth)acrylate, 1,2-ethylene glycol di(meth)acrylate, urethane di(meth)acrylate, urethane tri(meth)acrylate, and mixtures thereof.

In order to reduce the fluidity of the obtained pressure-sensitive adhesive, the proportion of the crosslinking agent in the formulation may be more than 0 parts by mass, more than 0.1 parts by mass, 0.15 parts by mass or more, or preferably 0.2 parts by mass or more per a total of 100 parts by mass of the first monomer and the second monomer. In order to improve the adhesiveness of the obtained pressure-sensitive adhesive, the proportion of the crosslinking agent in the formulation may be 0.5 parts by mass or less, 0.45 parts by mass or less, 0.4 parts by mass or less, or preferably 0.3 parts by mass or less per a total of 100 parts by mass of the first monomer and the second monomer.

The tacky polymer is obtained by photopolymerizing or heat polymerizing the first monomer, the second monomer, and the crosslinking agent. When photopolymerizing or thermally polymerizing the abovementioned components, a photopolymerization initiator or thermal polymerization initiator may be further included along with the components. A benzoin alkyl ether, acetophenone, benzophenone, benzyl methyl ketal, hydroxycyclohexylphenyl ketone, 1,1-dichloroacetophenone, 2-chlorothioxantone, or the like can be used as the photopolymerization initiator, with commercially sold examples including Irgacure 651 (2,2-dimethoxy-1,2-diphenylethane-1-one) from Ciba Specialty Chemicals and Darocur 1173 from Merck Japan. An azo polymerization initiator (such as 2,2'-azobisisobutyronitrile), peroxide polymerization initiator (such as dibenzoyl peroxide or t-butyl hydroperoxide), redox polymerization initiator, or the like can be used as a thermal polymerization initiator.

When obtaining the tacky polymer, a third monomer may be further included in addition to the first monomer, the second monomer, and the crosslinking agent. Examples of the third monomer include monomers, fillers, antioxidants, and the like that are capable of being copolymerized with and are different from the abovementioned components.

Examples of polyvinyl acetals include polyvinyl butyral, polyvinyl formal, polyvinyl acetoacetal, polyvinyl propylal, and the like. The content amount of polyvinyl acetal may be 5 to 25 parts by mass or 5 to 20 parts by mass per a total of 100 parts by mass of the first monomer and the second monomer for the sake of tackiness at room temperature. For the sake of the miscibility with the first monomer, the second monomer, and the epoxy resin, the hydroxyl group content of the polyvinyl acetal may be 9 to 15%. For the sake of adhesion to adherends, the molecular weight of the polyvinyl acetal may be 80,000 or less.

A compound containing two or more epoxy groups per molecule derived, for example, from a glycidyl group, a cyclohexene oxide group, or the like can be used as the epoxy resin. Specific examples of epoxy resins include phenolic epoxy resins, bisphenol epoxy resins, halogenated bisphenol epoxy resins, and mixtures thereof. A diglycidyl ether of bisphenol A can be especially preferably used as the bisphenol epoxy resin.

More specific examples of epoxy resins include bisphenol A epoxy resins (such as those sold under the trade names EPON SU-8, EPON SU-2.5, EPON 828, EPON 1004F, and EPON 1001F (Shell Chemical Co.), DER-332 and DER-334 (Dow Chemical Co.)); bisphenol F epoxy resins (such as Araldite GY281 from Ciba Specialty Chemicals); flame-resistant epoxy resins (such as brominated bisphenol epoxy resin obtainable from Dow Chemical Co. under the trade name DER-542); hydrogenated bisphenol A-epichlorohydrin epoxy resins (such as EPONEX 1510 from Shell Chemical Co.); and polyglycidyl ethers of phenol formaldehyde novolac resin (such as DEN-431 and DEN-438 from Dow Chemical Co.).

In order to improve the adhesive strength (cleavage strength) of the pressure-sensitive adhesive, the epoxy resin content may be 50 parts by mass or more, 60 parts by mass or more, or 80 parts by mass or more per a total of 100 parts by mass of the first monomer and the second monomer. In order to reduce the fluidity of the pressure-sensitive adhesive, the epoxy resin content may be 150 parts by mass or less, 130 parts by mass or less, or 120 parts by mass or less per a total of 100 parts by mass of the first monomer and the second monomer.

Examples of epoxy resin curing agents include photocuring agents such as aromatic iodonium complex salts, aromatic sulfonium complex salts, and metallocene salts, and amine-, amide-, Lewis acid complex-, and anhydride-based photocuring agents. More specific examples of epoxy resin curing agents include the aromatic sulfonium complex salt FX-512 (3M Company), the aromatic sulfonium complex salt CD-1010 (Sartomer), the diaryl iodonium complex salt CD-1012 (Sartomer), the aromatic sulfonium complex salt UV1-6974 (Union Carbide Corp.), the metallocene complex salt Irgacure 261 (Ciba Specialty Chemicals), the dicyandiamide curing agent EH3636AS (Adeka), 2,4-diamino-6-[2'-methyl imidazolyl-(1')-]ethyl-s-triazine 2MZ-A-PW (Shikoku Chemicals Corp.), 2-phenyl-4-benzyl-5-hydroxymethyl imidazole, and the like.

The epoxy resin curing agent content may be 0.5 to 15 parts by mass per 100 parts by mass of the epoxy resin from the perspective of the combination of the epoxy resin and the epoxy resin curing agent that are used, and the adhesive strength of the cured adhesive.

The thermoset pressure-sensitive adhesive according to the present embodiment may further contain hollow microbubbles of glass or polymer, inorganic fillers, pigments, fibers, fabric, nonwoven fabric, effervescent agents, antioxidants, stabilizers, plasticizers, coloring agents, flame-proofing agents, chain transfer agents, flow adjusting agents, viscosity adjusting agents, bonding accelerators (such as silane coupling agents), and the like.

The thermoset pressure-sensitive adhesive according to the present embodiment may be worked into a sheetlike form using a conventionally known method such as solution casting or extrusion. During this process, the sheet of pressure-sensitive adhesive may be provided with a release film such as a silicone-treated polyethylene terephthalate film, a polyester film, a polyethylene film, or the like on one or both sides thereof. The form of the thermoset pressure-sensitive adhesive according to the present embodiment can be decided upon as appropriate according to the application. The thickness of the thermoset pressure-sensitive adhesive according to the present embodiment can be, for example, about 0.4 to 1.0 mm.

The thermoset pressure-sensitive adhesive according to the present embodiment exhibits low fluidity. Specifically, the thermoset pressure-sensitive adhesive may exhibit an increase in area of 320% or less, 260% or less, or preferably 200% or less when left standing for 25 minutes in a 120° C. environment under a pressure of 2.5 kg/cm² after having been formed into a 0.6 mm-thick sheet. The area increase rate (%) is calculated according to the following formula (1).

$$\text{Area increase rate } (\%) = S_A/S_B \times 100 - 100 \tag{1}$$

$S_B$ represents the area of the thermoset pressure-sensitive adhesive before pressure is applied thereto, and $S_A$ represents the area of the thermoset pressure-sensitive adhesive after pressure has been applied thereto. In this context, "area" is the area of the surface of the thermoset pressure-sensitive adhesive to which pressure is applied. There is no particular limitation upon the area of the thermoset pressure-sensitive adhesive before pressure is applied thereto; for example, the area can be about 200 mm².

Note that if the thermoset pressure-sensitive adhesive has a thickness of less than 0.6 mm, multiple sheets of thermoset pressure-sensitive adhesive can be layered to a thickness of 0.6 mm before measuring the area increase rate as described above. If the thickness of the thermoset pressure-sensitive adhesive is greater than 0.6 mm, the adhesive can be adjusted to a thickness of 0.6 mm by cutting a portion, pressing, or the like before measuring the area increase rate as described above.

Examples of methods of producing the thermoset pressure-sensitive adhesive according to the present embodiment include preparing a syrupy tacky polymer precursor by partially polymerizing the first monomer, the second monomer, and the crosslinking agent, adding polyvinyl acetal, an epoxy resin, and an epoxy resin curing agent thereto, and then further polymerizing the first monomer, the second monomer, and the crosslinking agent, or polymerizing the first monomer, the second monomer, and the crosslinking agent to obtain a tacky polymer, adding polyvinyl acetal, an epoxy resin, and an epoxy resin curing agent thereto, and kneading the whole.

EXAMPLES

The present invention will now be described in further detail with the aid of examples, but the present invention is not limited to these examples.
Producing Pressure-Sensitive Adhesive
Pressure-sensitive adhesives having the compositions shown in Tables 1 and 2 were prepared using the following materials.
2EHA: 2-ethylhexyl acrylate (Nippon Shokubai)
BA: butyl acrylate (Mitsubishi Chemical)
DMAA: Dimethylacrylamide (Kohjin Film & Chemicals)
M5700: 2-hydroxy-3-phenoxypropyl acrylate (Toagosei)
Irgacure 651: Photopolymerization initiator (Ciba Specialty Chemicals)
HDDA: 1,6-hexanediol diacrylate (Kyoeisha Chemical)
B-79: polyvinyl butyral (hydroxyl group content: 11.5 to 13.5; molecular weight: 50,000 to 80,000) (Solutia Japan)
Epoxy resin: mixture of bisphenol A-type liquid epoxy resin and solid epoxy resin (Japan Epoxy Resins)
DICY: epoxy resin curing agent (ADEKA)
2MZA-PW: epoxy resin curing agent (Shikoku Chemicals Corp.)
R972: hydrophobic silica filler (Nippon Aerosil)

Specifically, 2EHA, DMAA, M5700, and part of the Irgacure 651 (in the amount indicated in the row "Irgacure (1)" in Tables 1 and 2) were first mixed. The obtained mixture was irradiated with 0.5 mW/cm² of ultraviolet radiation, and irradiation was ended when the mixture reached a viscosity of 1,000 cps. After the mixture had been irradiated with ultraviolet radiation, part of the Irgacure 651 (in the amount indicated in the row "Irgacure (2)" in Tables 1 and 2), B-79, HDDA, and the epoxy resin were added thereto, and the mixture was stirred, and then cooled to 23° C. DICY, 2MZA-PW, and R972 were then added to the mixture, which was stirred to obtain a pressure-sensitive adhesive. The obtained pressure-sensitive adhesive was applied to a transparent PET film, and laid upon a pressure-sensitive adhesive applied to another sheet of PET film. The thickness of the sheetlike pressure-sensitive adhesive was 0.6 mm. The sheetlike pressure-sensitive adhesive was irradiated with 0.5 mW/cm² of ultraviolet radiation to obtain a pressure-sensitive adhesive sheet sandwiched between the sheets of PET film. The total energy of the irradiated ultraviolet radiation was 1 J.

Figure 1B:
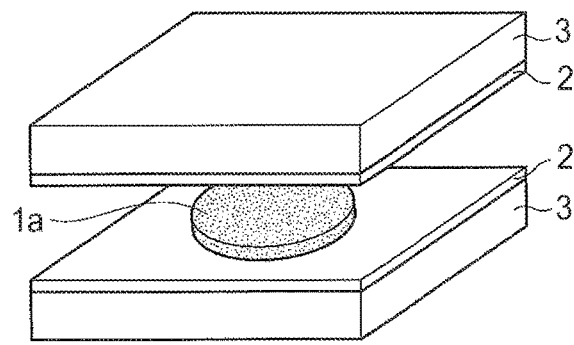
Figure 1C:
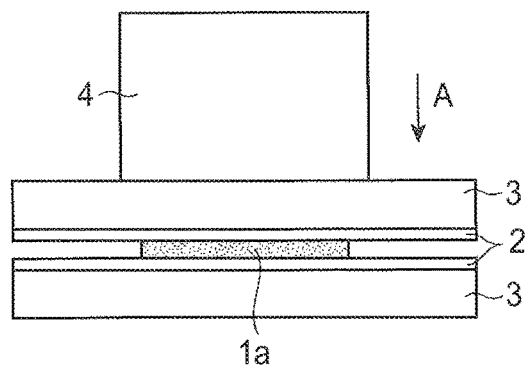

The obtained pressure-sensitive adhesive sheets were evaluated for fluidity and cleavage strength (high temperature, low temperature) as follows. The results are shown in Tables 1 and 2.
Fluidity (Area Increase Rate) Evaluation
First, a circular pressure-sensitive adhesive sheet 1a having a diameter of 16 mm was cut from a pressure-sensitive adhesive sheet 1, as shown in FIG. 1(a). Next, as shown in FIG. 1(b), the circular pressure-sensitive adhesive sheet 1a was sandwiched between a lamination of a polyethylene terephthalate (PET) film 2 and a glass substrate 3. Then, as shown in FIG. 1(c), a 5 kg weight 4 (namely, a pressure of 2.5 kg/cm²) was placed on the pressure-sensitive adhesive sheet 1a, the PET films 2, and the glass substrates 3 in the layering direction (namely, the direction indicated by arrow A), after which the whole was left standing for 25 minutes in a 120° C. atmosphere. Next, the pressure-sensitive adhesive sheet 1a was cooled to room temperature, after which the diameter R (mm) thereof was measured. The area increase rate (%) was then calculated according to the following formula (2).

$$\text{Area increase rate } (\%) = (R^2/16^2 \times 100) - 100 \tag{2}$$

Figure 2C:
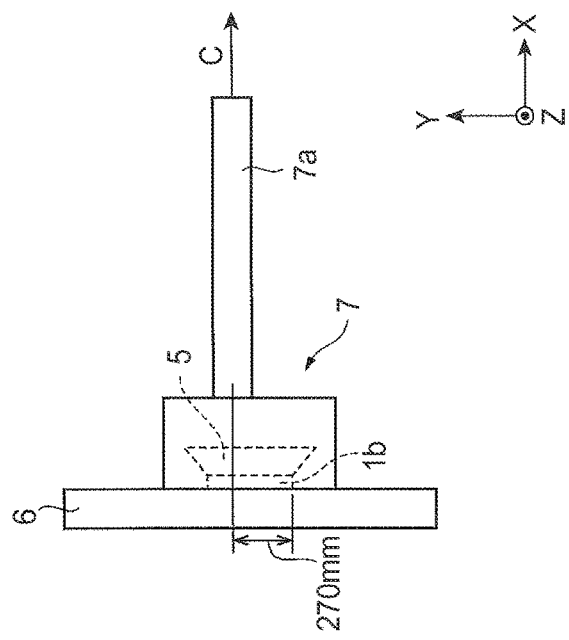
FIGS. 2A to 2C are schematic illustrations for describing a cleavage strength evaluation method.
Figure 2B:
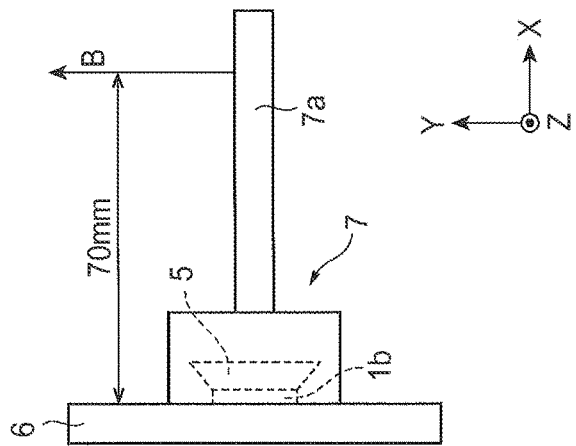
Figure 2A:
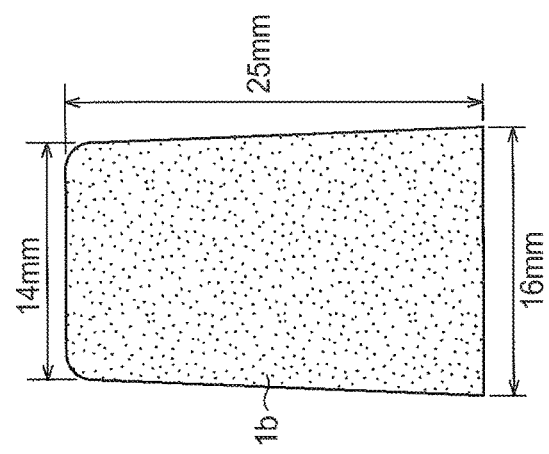

Low-Temperature Cleavage Strength Evaluation
First, a pressure-sensitive adhesive sheet 1b having the shape shown in FIG. 2(a) was prepared. The area of the pressure-sensitive adhesive sheet 1b was about 370 mm². Next, as shown in FIG. 2(b), the pressure-sensitive adhesive sheet 1b was oriented so that the long side thereof was roughly parallel with the direction of the Y axis in FIG. 2(b) and the short side thereof was roughly parallel with the direction of the Z axis in FIG. 2(b), and a steel button 5 was bonded to a glass substrate 6 with the pressure-sensitive adhesive sheet 1b disposed therebetween. The specimen constituted by the glass substrate 6, the pressure-sensitive adhesive sheet 1b, and the steel button 5 was then drawn at a rate of 1,000 mm/min in a direction horizontal to the surface of the glass substrate 6 (namely, the direction indicated by arrow B) by pulling a handle 7a of a fixture 7 in a 0° atmosphere. The cleavage strength (unit: N) at this time was measured.
High-Temperature Cleavage Strength Evaluation
A pressure-sensitive adhesive sheet 1b was prepared similarly to the method used for the low-temperature cleavage strength evaluation described above. Next, as shown in FIG. 2(c), the pressure-sensitive adhesive sheet 1b was oriented so that the long side thereof was roughly parallel with the direction of the Y axis in FIG. 2(c) and the short side thereof was roughly parallel with the direction of the Z axis in FIG. 2 (c), and a steel button 5 was bonded to a glass substrate 6 with the pressure-sensitive adhesive sheet 1b disposed therebetween. Next, a specimen constituted by a glass substrate 6, a pressure-sensitive adhesive sheet 1b, and a steel button 5 was heated for 25 minutes in a 140° C. atmosphere, cooled to room temperature, and left standing for 24 hours. Next, as shown in FIG. 2(c), a fixture 7 was attached to the specimen so that the central axis of a handle 7a of the fixture 7 was at a position 20 mm from the lower end (in other words, 5 mm from the upper end) of the pressure-sensitive adhesive sheet 1b, as shown in FIG. 2(c), and the handle 7a of the fixture 7 was pulled at a rate of 50 mm/min in a direction orthogonal to the surface of the glass substrate 6 (namely, the direction indicated by arrow C) in an 80° C. atmosphere. The cleavage strength (unit: N) at this time was measured.

TABLE 1

| | | Example 1 | Example 2 | Example 3 | Example 4 |
|---|---|---|---|---|---|
| Composition (parts by mass) | 2EHA | 70 | 70 | 70 | 70 |
| | BA | — | — | — | — |
| | DMAA | 25 | 25 | 25 | 25 |
| | M5700 | 5 | 5 | 5 | 5 |
| | Irgacure 651 (1) | 0.05 | 0.05 | 0.05 | 0.05 |
| | Irgacure 651 (2) | 0.15 | 0.15 | 0.15 | 0.15 |
| | B-79 | 10 | 10 | 10 | 10 |
| | HDDA | 0.3 | 0.3 | 0.05 | 0.05 |
| | Epoxy resin | 120 | 100 | 100 | 120 |
| | DICY | 8.0 | 8.0 | 8.0 | 8.0 |
| | 2MZA-PW | 2.6 | 2.6 | 2.6 | 2.6 |
| | R972 | 5.6 | 5.6 | 5.6 | 5.6 |
| Fluidity (area rate increase) (%) | | 195 | 180 | 254 | 308 |
| High-temperature cleavage strength (N) | | 620 | 643 | 520 | 554 |
| Low-temperature cleavage strength (N) | | 292 | 394 | 300 | 324 |

TABLE 2

| | | Comparative Example 1 | Comparative Example 2 | Comparative Example 3 | Comparative Example 4 | Comparative Example 5 |
|---|---|---|---|---|---|---|
| Composition (parts by mass) | 2EHA | 70 | 70 | 70 | 70 | — |
| | BA | — | — | — | — | 70 |
| | DMAA | 25 | 25 | 25 | 25 | 25 |
| | M5700 | 5 | 5 | 5 | 5 | 5 |
| | Irgacure 651 (1) | 0.05 | 0.05 | 0.05 | 0.05 | 0.05 |
| | Irgacure 651 (2) | 0.15 | 0.15 | 0.15 | 0.15 | 0.15 |
| | B-79 | — | — | — | — | — |
| | HDDA | 0.05 | 0.2 | 0.3 | 0.05 | 0.05 |
| | Epoxy resin | 150 | 150 | 150 | 120 | 100 |
| | DICY | 10.8 | 10.8 | 10.8 | 8.0 | 8.0 |
| | 2MZA-PW | 3.4 | 3.4 | 3.4 | 2.6 | 2.6 |
| | R972 | 5.6 | 5.6 | 5.6 | 5.6 | 5.6 |
| Fluidity (area rate increase) (%) | | 400 | 340 | 220 | 406 | 140 |
| High-temperature cleavage strength (N) | | 521 | 436 | 407 | 550 | 500 |
| Low-temperature cleavage strength (N) | | 333 | 211 | 195 | 280 | 120 |

What is claimed is:

1. A thermoset pressure-sensitive adhesive comprising a tacky polymer, polyvinyl acetal, an epoxy resin, and an epoxy resin curing agent;
   the tacky polymer being obtained by copolymerizing:
   a first monomer comprising at least one (meth)acrylate ester of a non-tertiary non-cyclic alcohol having 8 to 12 carbon atoms and having one (meth)acryloyl group;
   a second monomer comprising a nitrogen atom and an ethylenically unsaturated group; and
   more than 0 parts by mass to no more than about 0.5 parts by mass of a crosslinking agent per a total of 100 parts by mass of the first monomer and the second monomer.

2. The thermoset pressure-sensitive adhesive according to claim 1, wherein the adhesive exhibits an increase in area of about 320% or less when formed into a 0.6 mm-thick sheet and left standing for 25 minutes in a 120° C. atmosphere under a pressure of 2.5 kg/cm$^2$.

3. The thermoset pressure-sensitive adhesive according to claim 1, wherein a content amount of the polyvinyl acetal is in the range of from about 5 up to about 20 parts by mass per a total of 100 parts by mass of the first monomer and the second monomer.

4. The thermoset pressure-sensitive adhesive according to claim 1, wherein the first monomer comprises as an essential component a (meth)acrylate ester of a non-tertiary non-cyclic alcohol having 8 carbon atoms and having one (meth)acryloyl group.

5. The thermoset pressure-sensitive adhesive according to claim 2, wherein a content amount of the polyvinyl acetal is in the range of from about 5 up to about 20 parts by mass per a total of 100 parts by mass of the first monomer and the second monomer.

6. The thermoset pressure-sensitive adhesive according to claim 2, wherein the first monomer comprises as an essential component a (meth)acrylate ester of a non-tertiary non-cyclic alcohol having 8 carbon atoms and having one (meth)acryloyl group.

7. The thermoset pressure-sensitive adhesive according to claim 3, wherein the first monomer comprises as an essential component a (meth)acrylate ester of a non-tertiary non-cyclic alcohol having 8 carbon atoms and having one (meth)acryloyl group.

8. The thermoset pressure-sensitive adhesive according to claim 4, wherein the first monomer comprises as an essential component a (meth)acrylate ester of a non-tertiary non-cyclic alcohol having 8 carbon atoms and having one (meth)acryloyl group.

9. A method comprising:
   bonding together two surfaces using the thermoset pressure-sensitive adhesive of claim 1.

10. A method comprising:
   bonding together two surfaces using the thermoset pressure-sensitive adhesive of claim 2.

11. A method comprising:
bonding together two surfaces using the thermoset pressure-sensitive adhesive of claim 3.

12. A method comprising:
bonding together two surfaces using the thermoset pressure-sensitive adhesive of claim 4.

13. A method comprising:
bonding together two surfaces using the thermoset pressure-sensitive adhesive of claim 5.

14. A method comprising:
bonding together two surfaces using the thermoset pressure-sensitive adhesive of claim 6.

15. A method comprising:
bonding together two surfaces using the thermoset pressure-sensitive adhesive of claim 7.

16. A method comprising:
bonding together two surfaces using the thermoset pressure-sensitive adhesive of claim 8.

17. A joint formed by two substrates bonded together using the thermoset pressure-sensitive adhesive according to claim 1.

18. A joint formed by two substrates bonded together using the thermoset pressure-sensitive adhesive according to claim 2.

19. A joint formed by two substrates bonded together using the thermoset pressure-sensitive adhesive according to claim 3.

20. A joint formed by two substrates bonded together using the thermoset pressure-sensitive adhesive according to claim 4.

* * * * *

UNITED STATES PATENT AND TRADEMARK OFFICE
CERTIFICATE OF CORRECTION

PATENT NO. : 10,077,384 B2
APPLICATION NO. : 15/122189
DATED : September 18, 2018
INVENTOR(S) : Kotaro Shinozaki Page 1 of 1

It is certified that error appears in the above-identified patent and that said Letters Patent is hereby corrected as shown below:

Column 2
Lines 29-30, delete "/cl9/iupac" and insert -- /c19/iupac --, therefor.

Column 7
Line 18, under (Table 2), delete "temperatare" and insert -- temperature --, therefor.

Signed and Sealed this
Thirteenth Day of November, 2018

Andrei Iancu
*Director of the United States Patent and Trademark Office*